(12) United States Patent
Steinlage et al.

(10) Patent No.: US 6,786,130 B2
(45) Date of Patent: Sep. 7, 2004

(54) DIRECTLY ACTUATED DEPTH CONTROL

(75) Inventors: David Lee Steinlage, Dallas Center, IA (US); Brian Thomas Mosdal, Ankeny, IA (US); James Thomas Noonan, Bondurant, IA (US); Garrett Lee Goins, Ankeny, IA (US); Anthony Scott Royer, Adel, IA (US); David Alan Payne, Urbandale, IA (US)

(73) Assignee: Deere & Company, Moline, IL (US)

( * ) Notice: Subject to any disclaimer, the term of this patent is extended or adjusted under 35 U.S.C. 154(b) by 73 days.

(21) Appl. No.: 10/281,443

(22) Filed: Oct. 25, 2002

(65) Prior Publication Data

US 2004/0079223 A1 Apr. 29, 2004

(51) Int. Cl.[7] ................................................. F15B 9/10
(52) U.S. Cl. .......................................... 91/390; 172/318
(58) Field of Search ............................. 91/390; 172/318

(56) References Cited

U.S. PATENT DOCUMENTS

| | | | | |
|---|---|---|---|---|
| 2,877,743 | * | 3/1959 | Liaaen | 91/390 |
| 3,924,689 | * | 12/1975 | Manor | 91/390 |
| 5,366,024 | * | 11/1994 | Payne | 172/318 |
| 5,427,184 | | 6/1995 | Peck | 172/395 |
| 5,988,293 | | 11/1999 | Brueggen et al. | 172/414 |

FOREIGN PATENT DOCUMENTS

GB 0098083 A1 * 1/1984 ............. F15B/9/08

* cited by examiner

*Primary Examiner*—Edward K. Look
*Assistant Examiner*—Igor Kershteyn

(57) ABSTRACT

A depth control system particularly useful for single point depth control on an agricultural implement includes a valve and actuator mounted directly to the pivotal connection areas of a hydraulic cylinder that controls height. Cylinder motion directly controls valve actuation independently of complicated linkages to reduce the size and cost of the system and substantially overcome hysteresis problems.

20 Claims, 1 Drawing Sheet

DIRECTLY ACTUATED DEPTH CONTROL

FIELD OF THE INVENTION

The present invention relates directly to lift systems on agricultural implements and, more specifically, to a depth control actuation system for such implements.

BACKGROUND OF THE INVENTION

Agricultural implements with hydraulically actuated depth or lift systems often include depth control systems such as shown in commonly assigned U.S. Pat. Nos. 5,427,184 and 5,988,293. A typical system may include a valve which is activated to stop vertical movement of the frame as the implement is lowered to a selected working position.

Many hydraulically controlled agricultural implements utilize a single point depth control system wherein implement depth is monitored and adjusted at a single location on the implement. Typically, a plunger bracket assembly is slidably mounted on an actuator tube operably connected to the implement rockshaft. A plunger on the assembly contacts a poppet valve to stop fluid flow from the hydraulic lift cylinders at a preselected depth. To adjust depth, a set screw on the bracket assembly is loosened, and the bracket assembly is slid along the tube. The screw is tightened to secure the assembly at the desired location along the tube. Normally the amount of depth adjustment is small. When the set screw is unthreaded, the bracket is loosened from the tube and slides on the tube, often to a wrong location. The bracket has to be manually moved, and the amount of adjustment has to be determined visually. When the set screw is tightened, the bracket often changes location. Several trials may be required to achieve the desired position. Therefore, depth adjustment is often imprecise, difficult to repeat, and time consuming.

In another type of depth control, which is the subject of commonly assigned U.S. Pat. No. 5,427,184, a long crank is provided to adjust a linkage adjacent the depth control cylinder. Although such a device has the advantage of directly monitoring cylinder extension and retraction, the valve and linkage components are more complicated, expensive and difficult to access, and are subject to damage by crops and soil passing through the machine. A further type of control is shown in commonly assigned U.S. Pat. No. 5,988,293. Although these types of devices have alleviated some of the problems associated with depth control structures, most require complicated and expensive linkages, particularly if the depth adjustment is conveniently located for the operator. Wear and hysteresis limit the ability of such structures to provide accurate and repeatable depth control functions.

SUMMARY OF THE INVENTION

It is therefore an object of the invention to provide an improved depth control system for an implement. It is a further object to provide such a system which overcomes most or all of the aforementioned problems. It is still another object to provide such a system which is particularly useful with single point depth control structures.

It is another object of the invention to provide an improved depth control system for an implement having reduced hysteresis and improved repeatability compared to at least most previously available systems. It is a further object to provide such a system which is less complicated, easier and less expensive to manufacture, and easier to access than most systems.

A depth control system includes a valve and actuator mounted directly to the pivotal connection areas of a hydraulic cylinder that controls height. Cylinder motion therefore directly controls valve actuation independently of complicated linkages to reduce the size and cost of the system and substantially overcome hysteresis problems. These and other objects, features and advantages of the invention will become apparent from the description below in view of the drawings.

DESCRIPTION OF THE PREFERRED EMBODIMENT

Figure 1:
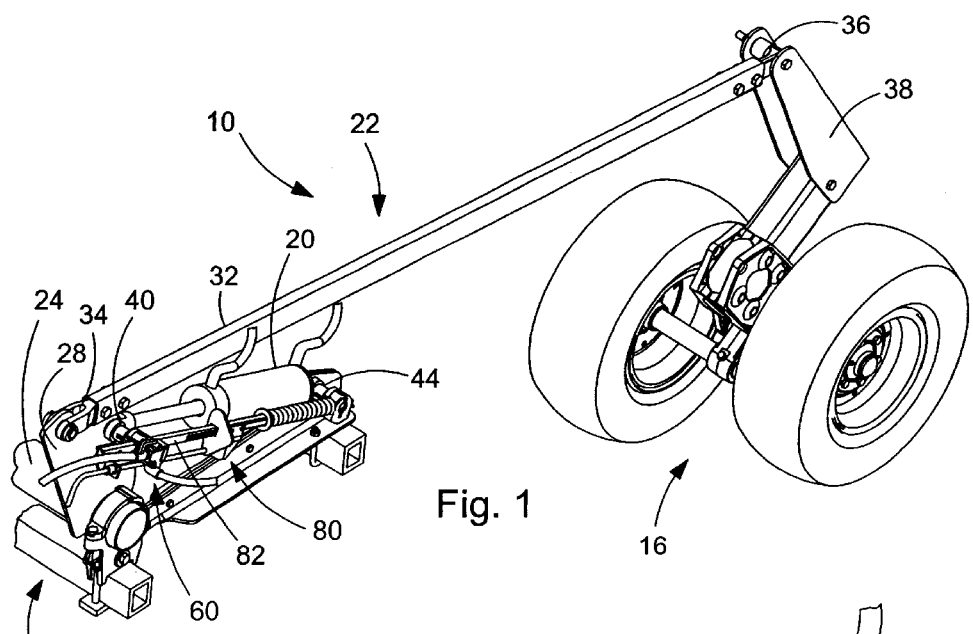
FIG. 1 is a perspective view of a portion of an implement with height control structure.
Figure 2:
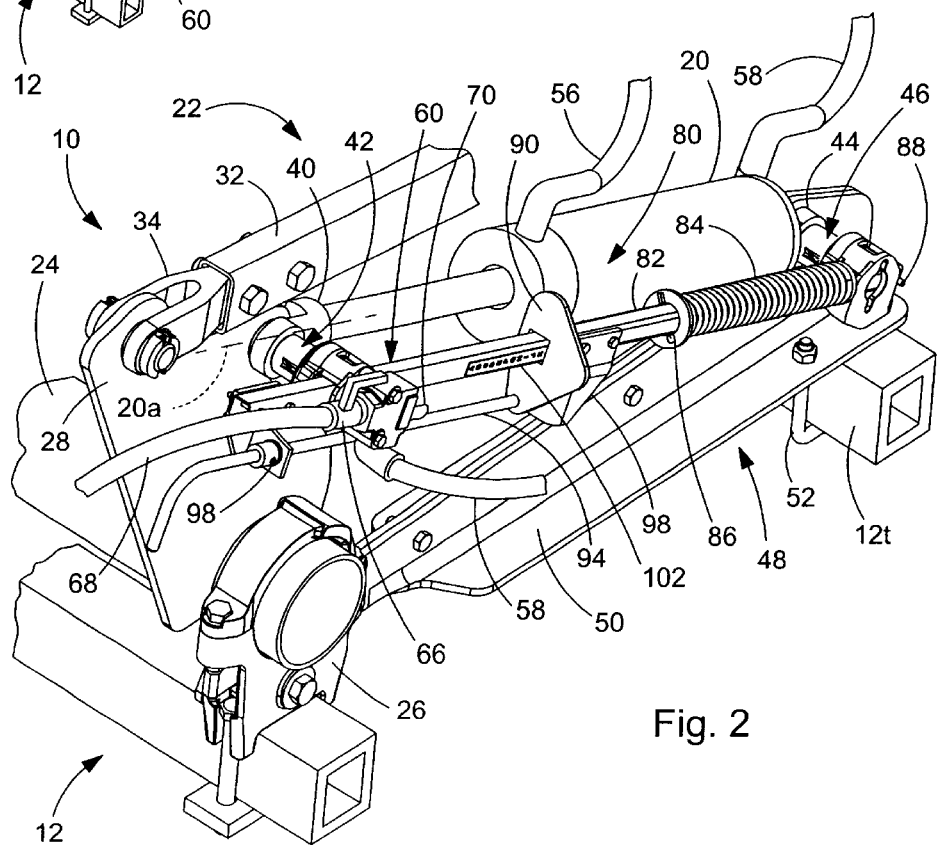
FIG. 2 is an enlarged perspective view of the height control structure on the implement of FIG. 1.

Referring now to FIGS. 1 and 2, therein is shown a portion of an agricultural implement 10 having a tool-supporting frame 12 supported for forward movement over a field by lift wheel structure 16. Hydraulic cylinder structure 20 is connected through a lift linkage 22 to the wheel structure 16 to selectively raise and lower the frame 12. Tools (not shown) can be mounted on the frame for vertical movement therewith between field-working and transport positions. Depth control for soil engaging elements is provided by the vertical movement of the frame 12.

A rockshaft 24 extending transversely to the forward direction of the travel of the implement is rotatably mounted on the frame 12 by bearing block support structure 26. A lever or arm 28 is fixed to and extends upwardly from the rockshaft 24 closely adjacent the support structure 26 for rotation with the rockshaft about a transversely extending axis. The lift linkage 22 includes a tension link 32 pivotally connected at a forward end 34 to the arm 28. The link 32 includes an aft end 36 pivotally connected to an upright arm 38 on the wheel structure 16. As the forward end 34 of the link 32 is moved in the fore-and-aft direction, the wheel structure 16 is pivoted relative to the frame 12 to raise and lower the frame.

The cylinder 20 includes a rod end 40 pivotally connected by elongated cylinder pin structure 42 to the rockshaft arm 28 rearwardly and below the pivotal connection at the forward end 34 to the arm 28. The cylinder 20 includes a base end 44 pivotally connected by a second elongated cylinder pin structure 46 to an aft end of a cylinder support bracket structure 48. The cylinder support bracket 48 includes an angle support 50 having a forward end connected to the bearing block support structure 26. The aft end of bracket 48 is connected by a U-bolt assembly 52 to a transversely extending frame tube 12t.

The rod and base ends of the cylinder 20 are connected by hydraulic lines 56 and 58, respectively, to a controlled source of hydraulic fluid for extending and retracting the cylinder. The base end line 58 is connected to a lower output port on a control valve 60 which is mounted directly on the rod end cylinder pin structure 42. The control valve 60 includes a forwardly directed inlet port connected through a manual lock-up valve 66 and fluid line 68 to a controlled source of hydraulic fluid on the towing vehicle (not shown). The control valve 60 includes an outwardly biased valve actuator 70, which when in the position shown in FIG. 2 allows generally unrestricted flow between the base end of the cylinder 20 and the source. The actuator 70, when depressed against the bias, blocks flow between the cylinder 20 and the source. The valve 66 is normally open during field operations but can be closed to lock the cylinder 20 in a selected position such as the extended position during transport of the implement 10.

Valve actuator structure 80 is supported from the rod and base ends 40 and 44 of the cylinder 20 and includes a tube or guide 82 slidably received through mating apertures in the cylinder pin structures 42 and 46. A spring 84 is captured on the base end of the guide 82 between pin and washer structure 86 and the pin structure 46, and an aft end pin 88 prevents the guide 82 from sliding forwardly out from the aperture in the pin structure 46. The forward end of the guide 82 extends through and freely slides within the aperture in the rod end pin structure 42 while the base end of the guide normally remains fixed relative to the base end pin structure 46. In case of binding, over-retraction of the cylinder 20 or improper adjustment of the actuator structure 80, the spring 84 can compress to allow the guide 82 to slide rearwardly relative to the pin structure 46 to prevent bending or breaking of the actuator structure 80.

The actuator structure 80 includes a plate or contact member 90 slidably supported on the guide 82. An adjustment rod 94 is rotatably supported from the guide 82 by a forward rod bracket 96 and an aft rod bracket 98 below and parallel to the guide 82. The guide 82 is supported generally parallel to cylinder axis 20a and remains parallel to the cylinder axis with extension and retraction of the cylinder. The rod 94 has a threaded central portion received through a threaded aperture at the lower end of the contact member 90. By rotating the rod 94, the contact member 90 can be adjustably positioned along a central portion of the guide 82. Indices 102 are provided along the central portion to provide the operator with a visual indication of the adjusted position of the contact member 90. As the cylinder 20 is retracted by opening the hydraulic line 68 to reservoir, the frame 12 lowers. The valve 60 moves with the rod end pivot structure 42 rearwardly relative to the contact member 90 as the forward end of the guide slides through the pin structure 42. The valve 60 and contact member 90 converge generally along a straight path parallel to the cylinder axis 20a until the member 90 depresses the valve actuator 70 and blocks flow from the base end of the cylinder 20 through the line 58 to establish an adjusted frame position dependent on the adjusted position of the contact member 90 along the guide 82. To raise the frame, the operator pressurizes the line 68 using a control valve on the towing vehicle and a one-way check valve (not shown) in the valve 60 allows hydraulic fluid to enter the base end of the cylinder 20 to extend the cylinder rod and raise the frame.

Having described the preferred embodiment, it will become apparent that various modifications can be made without departing from the scope of the invention as defined in the accompanying claims.

We claim:

1. Height control for an implement having hydraulically controlled lift structure connected to a frame and operable to raise and lower the frame, the height control comprising:
    an extendable and retractable lift cylinder;
    a linkage connected to the lift structure;
    cylinder pivot structure connecting the cylinder between the frame and the linkage for adjusting the height of the implement by extension and retraction of the cylinder;
    a valve supported on the cylinder pivot structure and having an on position and a blocking position; and
    valve actuator structure supported from the cylinder pivot structure and operable with extension and retraction of the cylinder to change the position of the valve for establishing a selected frame position.

2. The height control structure set forth in claim 1 wherein the cylinder defines a cylinder axis and wherein the valve actuator structure includes a contact surface which moves along a linear path parallel to the cylinder axis directly with extension and retraction of the cylinder, the valve lying in the path and movable to the blocking position by the movement of the contact surface to provide the selected frame position.

3. The height control structure set forth in claim 1 wherein the cylinder pivot structure includes a rod end and base end pins, and wherein the valve is supported from one of the pins.

4. The height control structure set forth in claim 3 wherein the valve actuator structure includes an actuator guide slidably supported by the pins.

5. The height control structure set forth in claim 4 wherein the valve actuator structure further includes a contact surface adjustably mounted for movement along the actuator guide, the contact surface engaging the actuator and establishing the blocking position.

6. The height control structure set forth in claim 4 wherein the actuator guide is supported in parallel relationship with the cylinder.

7. The height control structure set forth in claim 1 wherein the valve actuator structure includes a guide extending parallel to the cylinder, and wherein the valve actuator structure and the valve move relative to each other in a linear path with extension and retraction of the cylinder, the valve actuator structure contacting the valve to change the position of the valve as the implement approaches a selected working position.

8. The height control structure set forth in claim 7 wherein the cylinder pivot structure comprises rod and base end pins and wherein the guide is slidably received by the rod end pin.

9. The height control structure set forth in claim 8 wherein the valve is supported from the rod end pin.

10. The height control structure set forth in claim 8 wherein the guide facilitates adjustment of the actuator engaging structure relative to the valve.

11. Position control for an implement having hydraulically controlled lift structure connected to a frame and operable to raise and lower the frame, the position control comprising:
    an extendable and retractable cylinder having an axis, a base end connected to the frame, and a rod end;
    a linkage connecting the rod end to the lift structure for raising and lowering the frame with extension and retraction of the cylinder;
    a valve supported from one of the ends of the cylinder and having an on position and a blocking position;
    actuator structure supported from the rod and base ends of the cylinder and including an axially adjustable contact member; and
    wherein the contact member and the valve move relative to each other along a linear path generally parallel to the cylinder axis directly with extension and retraction of the cylinder, the valve movable to the blocking position by the relative movement of the contact member and valve to establish an adjusted implement frame position.

12. The position control set forth in claim 11 wherein the rod and base ends of the cylinder are connected by pivot pins to the linkage and the frame, and wherein the valve is supported from one of the pins.

13. The position control set forth in claim 12 wherein the actuator structure includes a guide member supported by and extending between the pins and the contact member is adjustably supported by the guide member.

14. The position control set forth in claim 13 wherein the guide member is slidably received by one of the pins.

15. The position control set forth in claim 11 wherein the actuator structure includes a guide member supported slidably received by the pins and wherein the contact member is adjustable along the guide member.

16. The position control set forth in claim 15 including a threaded member connected to the guide member and the contact member for adjusting the contact member.

17. The position control set forth in claim 15 including a spring member biasing the contact member towards the valve.

18. Position control for an implement having hydraulically controlled lift structure connected to a frame and operable to raise and lower the frame, the position control comprising:

an extendable and retractable cylinder having a rod end and a base end connected to the frame and the lift structure for raising and lowering the frame with extension and retraction of the cylinder;

a valve support connected to one of the ends of the cylinder;

a valve having an on position and a blocking position mounted to the valve support;

actuator structure extending between the rod and base ends and slidably received by the valve support, the actuator structure including an adjustable contact member; and wherein the adjustable contact member and valve move relative to each other along a path directly with extension and retraction of the cylinder, the valve movable to the blocking position by the relative movement of the contact member and valve to establish an adjusted implement frame position.

19. The position control set forth in claim 18 and wherein the valve support comprises pin structure pivotally connecting the cylinder to the lift structure.

20. The position control set forth in claim 19 wherein the actuator structure includes a guide member supported for sliding movement relative to the pin structure.

* * * * *